United States Patent
Wittenauer et al.

(10) Patent No.: US 10,897,363 B2
(45) Date of Patent: Jan. 19, 2021

(54) AUTHENTICATING A SECONDARY DEVICE BASED ON ENCRYPTED TABLES

(71) Applicant: CRYPTOGRAPHY RESEARCH, INC., Sunnyvale, CA (US)

(72) Inventors: Joel Patrick Wittenauer, Sunnyvale, CA (US); Scott C. Best, Sunnyvale, CA (US); Paul Carl Kocher, Sunnyvale, CA (US)

(73) Assignee: Cryptography Research, Inc., San Jose, CA (US)

( * ) Notice: Subject to any disclaimer, the term of this patent is extended or adjusted under 35 U.S.C. 154(b) by 43 days.

(21) Appl. No.: 15/771,076

(22) PCT Filed: Nov. 16, 2016

(86) PCT No.: PCT/US2016/062331
§ 371 (c)(1),
(2) Date: Apr. 25, 2018

(87) PCT Pub. No.: WO2017/087552
PCT Pub. Date: May 26, 2017

(65) Prior Publication Data
US 2018/0316512 A1    Nov. 1, 2018

Related U.S. Application Data

(60) Provisional application No. 62/256,362, filed on Nov. 17, 2015.

(51) Int. Cl.
*H04L 9/32*    (2006.01)
(52) U.S. Cl.
CPC .................. *H04L 9/3271* (2013.01)
(58) Field of Classification Search
CPC .................................................... H04L 9/3271
(Continued)

(56) References Cited

U.S. PATENT DOCUMENTS 4,985,638 A * 1/1991 Brock ................. H01F 7/18
307/38
5,748,739 A * 5/1998 Press ................. H04L 9/3273
380/28

(Continued)

FOREIGN PATENT DOCUMENTS

EP    1549019 B1    2/2009

OTHER PUBLICATIONS

Notification Concerning Transmittal of International Preliminary Report on Patentability dated May 31, 2018 re: Int'l Appln. No. PCT/US16/062331. 9 Pages.

(Continued)

*Primary Examiner* — David J Pearson
*Assistant Examiner* — Badri Champakesan
(74) *Attorney, Agent, or Firm* — Lowenstein Sandler LLP

(57) ABSTRACT

A table key capable of decrypting a first table from a plurality of encrypted tables may be received. Each of the encrypted tables may include at least one pair of values corresponding to a challenge value and a response value. A request to authenticate a secondary device may be received and in response to the request to authenticate the secondary device, a challenge value obtained by using the table key to decrypt an entry in the first table may be transmitted to the secondary device. A second challenge value may be transmitted to the secondary device and a cryptographic proof may be received from the secondary device. The validity of the cryptographic proof received from the secondary device may be authenticated based on the second challenge value and the response value obtained by using the table key to decrypt the entry in the first table.

23 Claims, 11 Drawing Sheets

(58) Field of Classification Search
USPC .......................................................... 713/168
See application file for complete search history.

(56) References Cited

U.S. PATENT DOCUMENTS

| | | | | |
|---|---|---|---|---|
| 6,028,937 | A * | 2/2000 | Tatebayashi | G06Q 20/3674 380/201 |
| 6,182,215 | B1 * | 1/2001 | Tatebayashi | H04L 9/3271 713/168 |
| 6,735,311 | B1 * | 5/2004 | Rump | H04L 63/0428 380/231 |
| 7,882,356 | B2 * | 2/2011 | Klemets | H04L 9/3213 713/172 |
| 8,010,810 | B1 * | 8/2011 | Fitzgerald | H04L 9/0894 713/193 |
| 8,086,853 | B2 * | 12/2011 | Warwick | H04L 63/08 713/168 |
| 8,165,302 | B2 * | 4/2012 | Pedlow, Jr. | H04L 9/0822 380/277 |
| 8,171,542 | B2 * | 5/2012 | Tucker | G11C 7/24 726/17 |
| 8,484,708 | B2 * | 7/2013 | Chern | H04L 67/02 726/7 |
| 9,537,663 | B2 * | 1/2017 | Mizikovsky | H04L 9/3271 |
| 10,554,695 | B2 * | 2/2020 | Ramalingam | H04L 65/1069 |
| 2008/0130558 | A1 * | 6/2008 | Lee | H04W 48/18 370/329 |
| 2008/0162926 | A1 * | 7/2008 | Xiong | H04L 63/0892 713/155 |
| 2010/0153719 | A1 * | 6/2010 | Duc | H04L 9/3271 713/168 |
| 2010/0293376 | A1 * | 11/2010 | Colon | H04L 9/3271 713/168 |
| 2011/0154043 | A1 * | 6/2011 | Lim | G06F 21/73 713/172 |
| 2011/0191589 | A1 * | 8/2011 | Dekker | H04N 21/26606 713/172 |
| 2011/0246770 | A1 * | 10/2011 | Badra | H04L 63/0869 713/168 |
| 2012/0110679 | A1 * | 5/2012 | Asano | H04L 9/3271 726/29 |
| 2012/0131340 | A1 * | 5/2012 | Teuwen | H04L 9/3278 713/168 |
| 2013/0160083 | A1 * | 6/2013 | Schrix | H04L 9/3271 726/3 |
| 2013/0246281 | A1 * | 9/2013 | Yamada | H04L 9/3231 705/71 |
| 2013/0343538 | A1 * | 12/2013 | Mizikovsky | H04L 63/0853 380/255 |
| 2014/0156998 | A1 * | 6/2014 | Lambert | H04L 9/3273 713/182 |
| 2014/0173280 | A1 * | 6/2014 | Bunker | H04L 9/3271 713/168 |
| 2015/0244525 | A1 * | 8/2015 | McCusker | H04L 9/3218 380/44 |
| 2015/0263861 | A1 * | 9/2015 | Kumar | H04L 9/32 713/168 |
| 2015/0269387 | A1 * | 9/2015 | Cannarsa | H04W 12/06 726/30 |
| 2015/0278506 | A1 * | 10/2015 | Jun | H04L 63/08 726/6 |
| 2015/0318998 | A1 * | 11/2015 | Erlikhman | G06F 21/44 713/171 |
| 2015/0326402 | A1 * | 11/2015 | Sibert | H04L 9/3236 713/155 |

OTHER PUBLICATIONS

Notification of Transmittal of the International Search Report and the Written Opinion of the International Searching Authority, or the Declaration dated Mar. 24, 2017 re: Int'l Appln. No. PCT/US16/062331. 17 Pages.

* cited by examiner

AUTHENTICATING A SECONDARY DEVICE BASED ON ENCRYPTED TABLES

BRIEF DESCRIPTION OF THE DRAWINGS

The present disclosure will be understood more fully from the detailed description given below and from the accompanying drawings of various implementations of the disclosure.

FIG. 9A illustrates a response key that has been generated by a secondary device in accordance with some embodiments.

FIG. 9B illustrates the response key after the response key has been modified based on a first operation corresponding to a first dormant circuit in accordance with some embodiments of the present disclosure.

FIG. 9C illustrates the response key that has been modified based on a second operation corresponding to a second dormant circuit in accordance with some embodiments.

DETAILED DESCRIPTION

Figure 1:
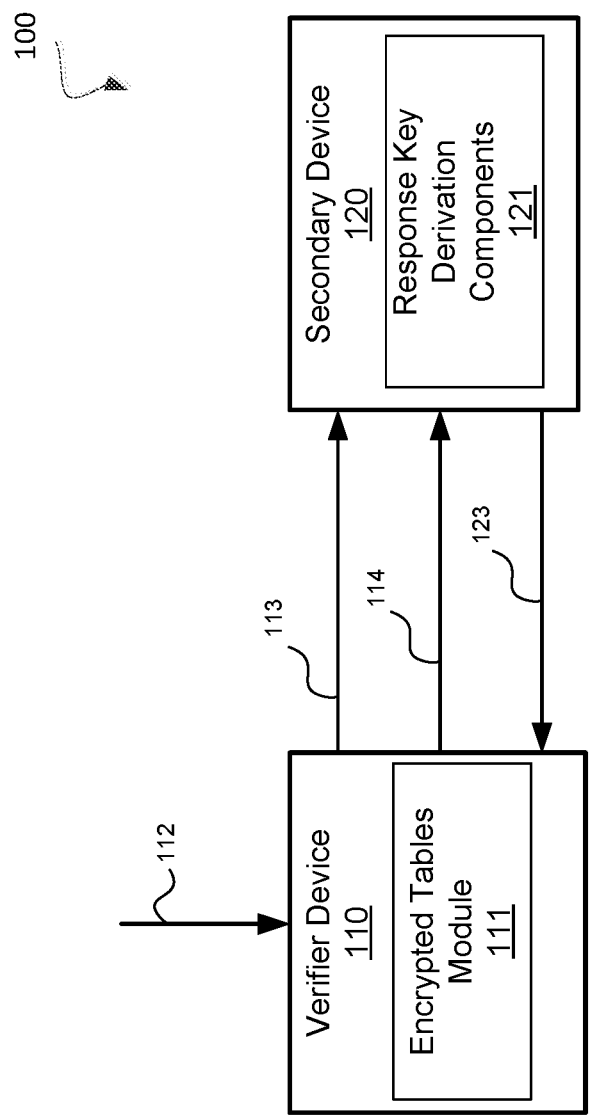
FIG. 1 illustrates an example environment with a verifier device that includes an encrypted tables module in accordance with some embodiments.

Aspects of the present disclosure are directed to authenticating a secondary device based on encrypted tables. A verifier device may interact with a secondary device (e.g., a peripheral device used with the verifier device). For example, the verifier device may be a printer and the secondary device may be a printer cartridge.

The use of the secondary device (including its acceptance for operation by the verifier device) may be conditionally based on an authentication of the secondary device by the verifier device. The secondary device may include circuitry that implements an algorithm that generates a key (i.e., a cryptographic key) that is based on a combination of another key stored in a memory of the secondary device and a first challenge data that is received from the verifier device. The verifier device may transmit a second challenge data to the secondary device after transmitting the first challenge data. In response, the secondary device may perform another cryptographic operation to generate a cryptographic proof that is based on a combination of the generated key and the second challenge. The secondary device may transmit the cryptographic proof to the verifier device that may verify the cryptographic proof and authenticate and allow interaction with the secondary device if the cryptographic proof is verified.

The verifier device may initiate the authentication process by using tables that include multiple pairs of a challenge and a corresponding response to the challenge (i.e., challenge-response pairs). The use of the tables allows the verifier device to store the corresponding responses to challenges while not using the circuitry to implement the algorithm that generates the responses. As will be described below in more detail, a security benefit of such an approach may be that a compromise of a verifier device does not expose details of the operation of the secondary device. The challenge in a pair may correspond to the first challenge data that is transmitted from the verifier device to the secondary device and the response that is paired with the first challenge may correspond to the key that is generated by the secondary device. The tables (also referred to as challenge-response tables) may thus store challenges and the expected responses (i.e., the expected generated key also referred to as a response key) that are to be generated for each of the challenges. Thus, a challenge-response table entry may include a first challenge and a response corresponding to a key that is based on a result of a particular algorithm (e.g., corresponding to the circuitry of the secondary device) generating the response based on another key (e.g., that is stored in the memory of the secondary device) and the first challenge.

As such, the use of the secondary device with the verifier device may be conditionally based on the verifier device authenticating the secondary device based on the challenge-response tables. However, an unauthorized entity (e.g., a counterfeiter) may decompile the software or firmware of the verifier device and obtain the challenge-response tables and may thus obtain the responses in the challenge-response tables and provide the responses for use in authentication of counterfeit secondary devices.

To provide additional security against the access to the responses by an unauthorized entity (e.g., by decompiling the firmware), the verifier device may use encrypted challenge-response tables. For example, the verifier device may include multiple challenge-response tables where each of the challenge-response tables is encrypted by a different key. The keys to decrypt the encrypted challenge-response tables (which may be referred to as table keys), may be received by the verifier device over time, instead of the verifier device storing all of the keys. For example, the verifier device may at first include multiple encrypted challenge-response tables where only one of the challenge-response tables is decrypted. The challenge-response pairs of the decrypted table may be used to authenticate a secondary device. At a later time, another table key may be received by the verifier device (which may be the same verifier device or a different one, such as a verifier device manufactured with different keys) where the received key may be used to decrypt another of the encrypted tables. The verifier device may then authenticate the secondary device based on the recently decrypted table. For example, the verifier device may use a challenge-response pair from the most recently decrypted table, or a challenge-response pair from any of the decrypted tables, etc.

Thus, keys may be received over time by the verifier device where the received keys are used to decrypt the encrypted tables where the challenge-response pairs of the decrypted tables are used to authenticate a secondary device. As described in additional detail below, in some embodiments, the tables may further include indicators or instructions to activate dormant circuits of the secondary device that may further be used in the authentication of the secondary device. The use of the dormant circuits may provide security against the unauthorized entity using a counterfeit secondary device with an expandable table. For example, the unauthorized entity may decompile the software or firmware of the verifier device to obtain each table that is decrypted and may update the expandable table of a counterfeit secondary device each that time another table of the verifier device is decrypted.

As such, aspects of the present disclosure provide greater security and renewability for the authentication of a secondary device by a verifier device. The use of the encrypted tables and the release of keys over time to decrypt the tables may provide security against an unauthorized entity to the pairs of first challenges and responses that are used to authenticate the secondary device if the unauthorized entity were to decompile software or firmware of the verifier device. Furthermore, the use of the dormant circuits may provide additional security in response to the unauthorized entity using an expandable table in a counterfeit secondary device.

FIG. 1 illustrates an example environment 100 with a verifier device 110 that includes an encrypted tables module 111. In general, the verifier device 110 of the environment 100 may perform an authentication of a secondary device 120.

As shown in FIG. 1, the verifier device 110 may include an encrypted tables module 111 that may receive one or more keys 112 (e.g., via a network from a server, via a firmware update, etc.) that are used to decrypt tables stored by the encrypted tables module 111. The verifier device 110 may transmit a first challenge 113 to the secondary device 120 in response to a system request for the verifier device 110 to interact with the secondary device 120 (e.g., the system could request a print operation, causing the printer to interact with an ink cartridge). The first challenge may be retrieved from a table of multiple tables stored by the encrypted tables module 111 that has been decrypted by at least one of the one or more keys 112. The secondary device 120 may subsequently generate a key. For example, an algorithm component of the response key derivation components 121 that may be implemented by circuitry of the secondary device 120 may receive one or more base keys stored in a memory (e.g., a one-time programmable memory) of the secondary device. The algorithm component may implement a cryptographic function such as a hashing algorithm. The algorithm component may further receive the first challenge 113 and may generate a response key based on a combination of the base key and the first challenge. As such, the secondary device 120 may generate a response key based on data (e.g., the first challenge) that is received from a table that has been decrypted by the verifier device 110.

The verifier device 110 may further transmit a second challenge 114 to the secondary device 120. In response, the secondary device 120 may generate a cryptographic proof 123 by using a second cryptographic function based on a combination of the response key and the second challenge 114. The second cryptographic function may correspond to, but is not limited to, an Advanced Encryption Standard (AES) keyed hash function. The secondary device 120 may then transmit the cryptographic proof 123 to the verifier device 110 which may subsequently authenticate the secondary device 120 based on the cryptographic proof 123 matching another cryptographic proof that is generated by the verifier device 110. For example, the verifier device 110 may generate a cryptographic proof based on a combination of the second challenge that was transmitted to the secondary device 120 and the response corresponding to the first challenge that was earlier transmitted to the secondary device 120. If the cryptographic proof 123 that is generated by the secondary device 120 matches the cryptographic proof that is generated by the verifier device 110, then the secondary device 120 may be considered to be authenticated by the verifier device 110. However, if the cryptographic proof 123 that is generated by the secondary device 120 does not match the cryptographic proof that is generated by the verifier device 110, then the secondary device 120 may not be considered to be successfully authenticated by the verifier device 110. In some embodiments, when the secondary device 120 is successfully authenticated, then the secondary device 120 may interact with the verifier device 110 (e.g., a printer cartridge may be able to be used by a printer). However, if the secondary device 120 is not successfully authenticated, then the secondary device 120 may not interact with the verifier device 110 (e.g., the printer cartridge may not be able to be used by the printer).

As such, if the secondary device 120 generated a response key that matches a response that corresponds to the transmitted first challenge from a pair of one of the tables of the encrypted tables module 111, then the cryptographic proof 123 that is generated by the secondary device 120 may match the cryptographic proof that is generated by the verifier device 110.

The secondary device 120 may further include dormant circuits 124 that may be activated based on challenges received from the verifier device 110. The dormant circuits 124 may be used to generate the cryptographic proof 123. Additional details with regard to the dormant circuits of a secondary device are described in conjunction with FIGS. 5-9C.

Figure 2:
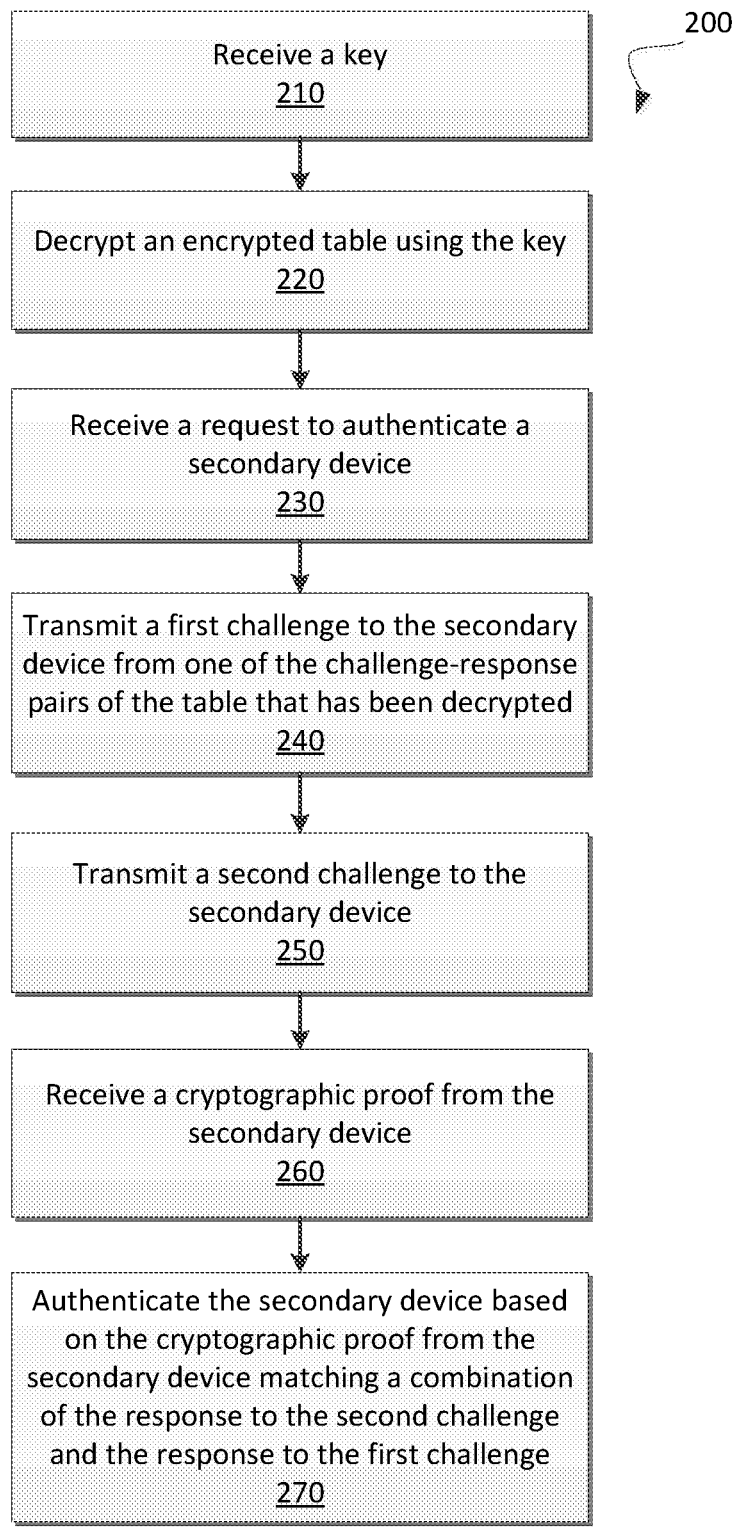
FIG. 2 is a flow diagram of an example method to authenticate a secondary device based on encrypted tables in accordance with some embodiments.

FIG. 2 is a flow diagram of an example method 200 to authenticate a secondary device based on encrypted tables. In general, the method 200 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 may be performed by the encrypted tables module 111 of FIG. 1.

As shown in FIG. 2, the method 200 may begin with the processing logic receiving a key (block 210). The key may be used to decrypt an encrypted table that includes one or more challenge-response pairs that is stored at a verifier device. The encrypted table that is decrypted may be one table from multiple tables that are stored by the verifier device. Each of the tables may include at least one pair of data that includes a first challenge and a corresponding response. The processing logic may further decrypt one of the encrypted tables by using the received key (block 220). In some embodiments, each of the encrypted tables may be decrypted by a different key. For example, a first key may be used to decrypt a first encrypted table and a second key may be used to decrypt a second encrypted table. However, the first key may not be used to decrypt the second encrypted table. The key may correspond to a private key that is used to decrypt an encrypted table that is encrypted by a public key that corresponds to the private key. In the same or alternative embodiments, the key may correspond to a symmetric key that is used to decrypt an encrypted table that is encrypted by the symmetric key.

Subsequently, the processing logic may receive a request to authenticate a secondary device (block 230). For example, the request to authenticate the secondary device may be received when the secondary device attempts to interact with a verifier device. The processing logic may transmit to the secondary device a first challenge from one of the challenge-response pairs of the table that has been decrypted by the received key (block 240). The processing logic may further transmit a second challenge to the secondary device (block 250) and receive a cryptographic proof from the secondary device (block 260). For example, the cryptographic proof may be received from the secondary device after the transmitting of the second challenge to the secondary device. The processing logic may subsequently authenticate the secondary device based on the cryptographic proof from the secondary device matching a combination of the response to the second challenge and the response to the first challenge (block 270). As such, a pair of data that includes a first challenge that is transmitted from a verifier device to a secondary device and a corresponding response are used to authenticate the secondary device after a table that includes the pair of data has been decrypted by a previously received key.

Figure 3:
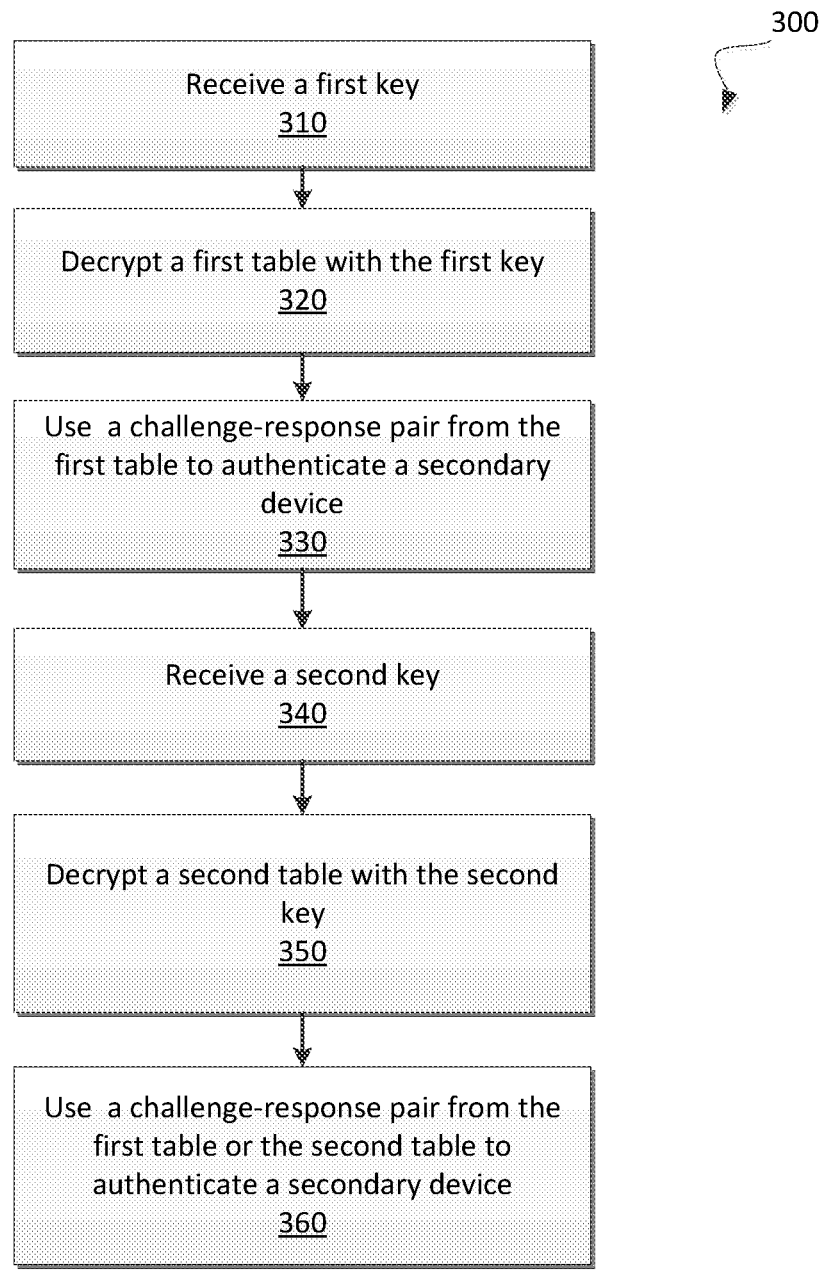
FIG. 3 is a flow diagram of an example method to receive keys to decrypt encrypted tables and to use the decrypted tables to authenticate a secondary device in accordance with some embodiments of the present disclosure.

FIG. 3 is a flow diagram of an example method 300 to receive keys to decrypt encrypted tables and to use the decrypted tables to authenticate a secondary device. In general, the method 300 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 may be performed by the encrypted tables module 111 of FIG. 1.

As shown in FIG. 3, the method 300 may begin with the processing logic receiving a first key (block 310). For example, the first key may be received by a verifier device after a threshold period of time has passed since the last key that the verifier device has received. The processing logic may subsequently decrypt a first table with the first key (block 320). For example, one table from multiple tables that are stored in encrypted form at the verifier device may be decrypted. The processing logic may then use the pairs of first challenges and responses from the first table to authenticate a secondary device (block 330). For example, one pair including a first challenge and a corresponding response may be used to authenticate the secondary device after the first table has been decrypted and in response to a request for the verifier device to authenticate the secondary device. At a later time, the processing logic may receive a second key (block 340). For example, after the threshold period of time has passed again since the receiving of the first key by the verifier device, the second key may be received by the verifier device. The processing logic may further decrypt a second table with the second key (block 350). For example, another table from multiple encrypted tables that are stored at the verifier device may be decrypted by using the second key. The processing logic may subsequently use the pairs of first challenges and responses from the first table or the second table to authenticate a secondary device (block 360). The first and second and subsequent keys may be delivered to the verifier in a variety of ways. In some embodiments, each of the first key and the second key may be received over a network from a server. In another embodiment, which can operate in combination with the others, new keys may be delivered to the verifier as part of a verifier firmware update. In another embodiment, which can operate in combination with the others, newly manufactured secondary devices may contain the most recently deployed decryption keys in a "version information" section of the secondary device's non-volatile memory.

As such, the authentication of a secondary device may use the pairs of first challenges and responses (i.e., challenge-response pairs) from the tables that have been decrypted. For example, the pair may be randomly selected from any of the tables that have been decrypted by the receiving of a key. In alternative embodiments, the pair may be selected so that a pair from the most recently decrypted table is weighted more heavily to be selected than a pair from a table that was decrypted earlier. For example, the pairs of first challenges and responses of the most recently decrypted table may be used more frequently to authenticate a secondary device than pairs of first challenges and responses from tables that were previously decrypted (e.g., a pair from a first table may be used forty percent of the time and a pair from a second table that was decrypted after the first table may be used sixty percent of the time). As such, in some embodiments, the authentication of the secondary device may use a pair from any table that has been decrypted.

In alternative embodiments, the authentication of the secondary device may use a pair from the most recently decrypted table. For example, a first table may be decrypted at a first time and a pair from the first table may be used to authenticate a secondary device. A second table may be decrypted at a second time that is subsequent to or after the first time. A subsequent request to authenticate the secondary device may use a pair from the second table that has been decrypted and not the first table that was decrypted before the decryption of the second table.

Figure 4:
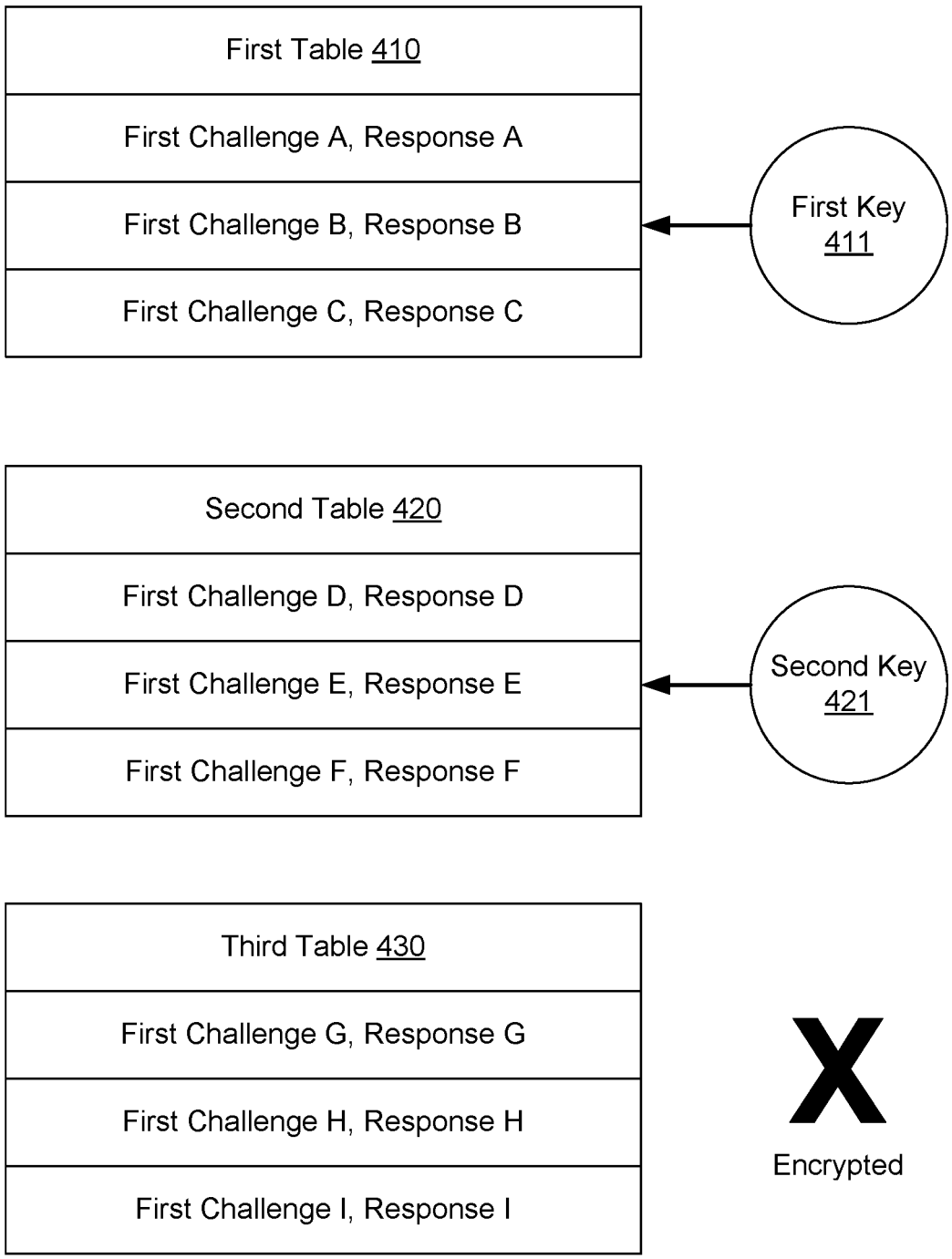
FIG. 4 illustrates the receiving of keys corresponding to encrypted tables in accordance with some embodiments.

FIG. 4 illustrates the receiving of keys corresponding to encrypted tables. In general, the encrypted tables may correspond to tables that are stored by the encrypted tables module 111 of a verifier device 110 of FIG. 1.

As shown in FIG. 4, a verifier device may include multiple encrypted tables 410, 420, and 430. The first table 410 may include three pairs of data where each pair includes one first challenge that is intended to be transmitted to a secondary device and a corresponding response that is intended to be used to generate a cryptographic proof as well as represent a response key that is generated by the secondary device to generate another cryptographic proof. As shown, the first encrypted table 410 may include a first pair of a first challenge A and a response A, a second pair with a first challenge B and a response B, and a third pair with a third first challenge C and a response C. The first table 410 may be encrypted until a first key 411 is received to decrypt the table 410. For example, the pairs of the first table 410 may not be accessible while encrypted and may be accessible when the first table 410 has been decrypted by the first key 411. Thus, the pairs of an encrypted table may not be used for authentication of a secondary device until the encrypted table has been decrypted by a key. A verifier device may use one of the first, second, or third pairs of first challenges and responses to authenticate a secondary device after decrypting the first table 410 with the first key 411. Similarly, the pairs of the second table 420 may be accessible after the receiving of the second key 421 that is used to decrypt the second table 420 so that the pairs of first challenges and responses of the second table 420 may be used to authenticate a secondary device. However, the third table 430 may not be accessible as a key that may be used to decrypt the third table 430 has not yet been received. As such, the pairs of first challenges and corresponding responses of the third table 430 may not be used to authenticate a secondary device.

Figure 5:
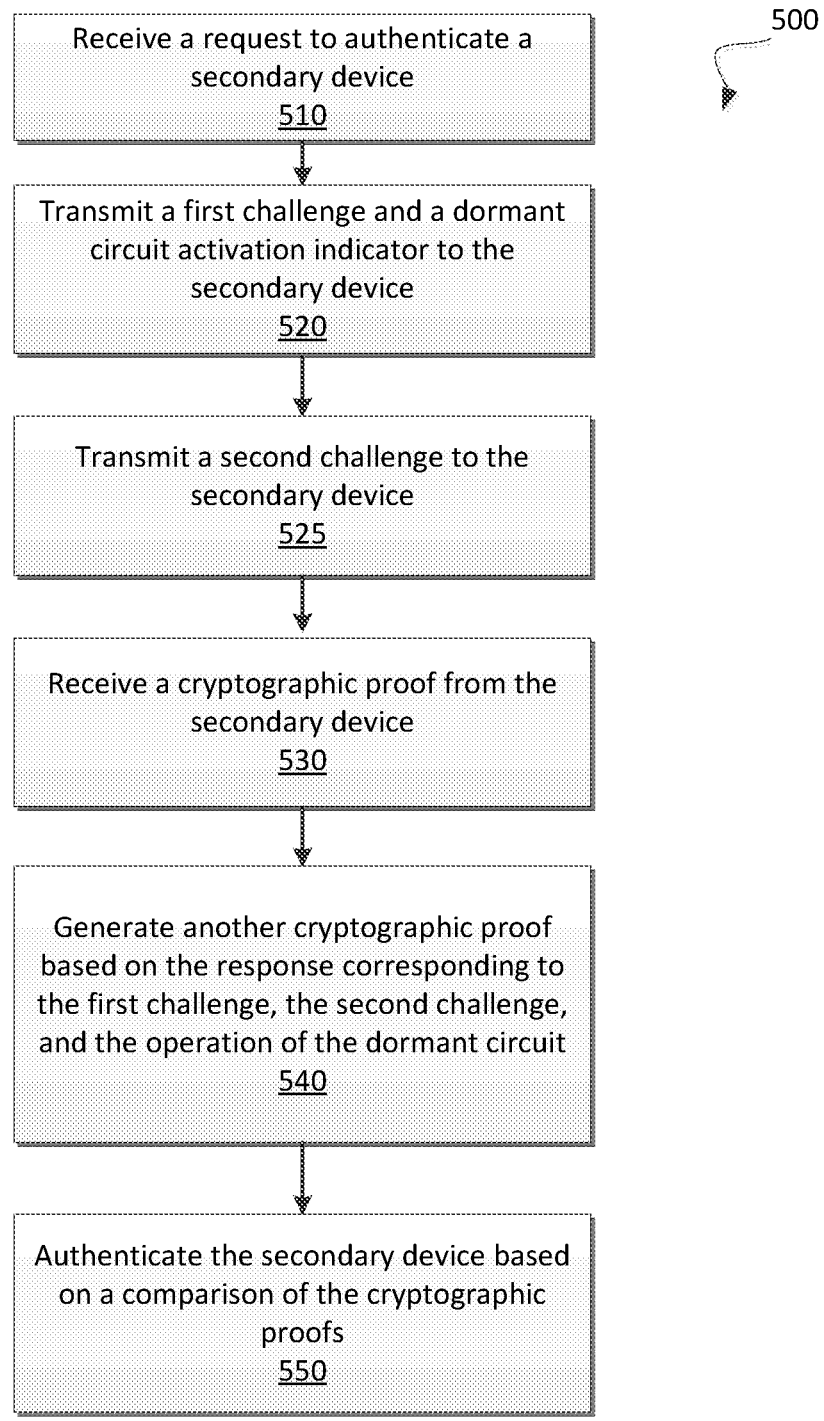
FIG. 5 is a flow diagram of an example method to authenticate a secondary device based on encrypted tables with activation indicators for dormant circuits of the secondary device in accordance with some embodiments of the present disclosure.

FIG. 5 is a flow diagram of an example method 500 to authenticate a secondary device based on encrypted tables with activation indicator for dormant circuits of the secondary device. In general, the method 500 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 may be performed by the encrypted tables module 111 of FIG. 1.

Aspects of the present disclosure may further utilize dormant circuits that may perform one or more operations to modify a value of a response key that is generated by a secondary device. As described in further detail below, the verifier device may transmit data that indicates that a particular dormant circuit is to be activated. The verifier device may further identify which dormant circuits have been activated and may use such an identification in the generation of a cryptographic proof that is compared with another cryptographic proof that is generated by the secondary device. Further details with regard to the secondary device and the use of the dormant circuits are described in conjunction with FIGS. 5-9C.

As shown in FIG. 5, the method 500 may begin with the processing logic receiving a request to authenticate a secondary device (block 510). The processing logic may further transmit a first challenge and a dormant circuit activation indicator to the secondary device (block 520). For example, the first challenge from a pair of a table that has been decrypted with a previously received key may be transmitted to the secondary device. Furthermore, the dormant circuit activation indicator may be associated with the table that includes the pair with the first challenge that is transmitted to the secondary device. For example, each table that is stored at a verifier device may be associated with a different dormant circuit activation indicator that may be transmitted to the secondary device along with each first challenge from the corresponding table or may be transmitted once with the first challenge from the table after the table has been decrypted. In some embodiments, the dormant circuit activation indicator may be included in the first challenge. For example, a hidden property of the first challenge may activate a dormant circuit (e.g., when the secondary device performs a hash function of the first challenge and the resulting hash value is a particular value). Thus, the secondary device may perform an operation on the first challenge that is received from the verifier device and may activate a dormant circuit based on the output result of the operation on the first challenge. For example, if the output (e.g. a first value) of the operation on the first challenge indicates that a particular dormant circuit is to be activated, then the dormant circuit may be enabled and if the output (e.g. a second value) of the operation does not indicate a particular dormant circuit is to be activated, then the dormant circuit may remain disabled. The processing logic may transmit a second challenge to the secondary device (block 525).

The processing logic may further receive a cryptographic proof from the secondary device (block 530) as previously described. For example, the verifier device may receive a cryptographic proof that has been generated based on a combination of a response key that is based on the first challenge, the second challenge that has been transmitted from the verifier device to the secondary device, and the operations of any of the dormant circuits that have been activated. The processing logic may then generate another cryptographic proof based on the response corresponding to the first challenge that was previously transmitted, the second challenge, and the operations of the dormant circuits for which the dormant circuit activation indicators have been transmitted from the verifier device to the secondary device (block 540). The processing device may subsequently authenticate the secondary device based on a comparison of the received cryptographic proof from the secondary device with the generated cryptographic proof (block 550).

As an example, the dormant circuits may perform an operation to change or modify a value of a response key that is generated by the secondary device. For example, the operation may "flip" the least significant bit of the response key (i.e., change a binary 1 to a 0, or a 0 to 1), the most significant bit of the response key, or any other bit or combination of bits of the response key from a first value to a second value.

Figure 6A:
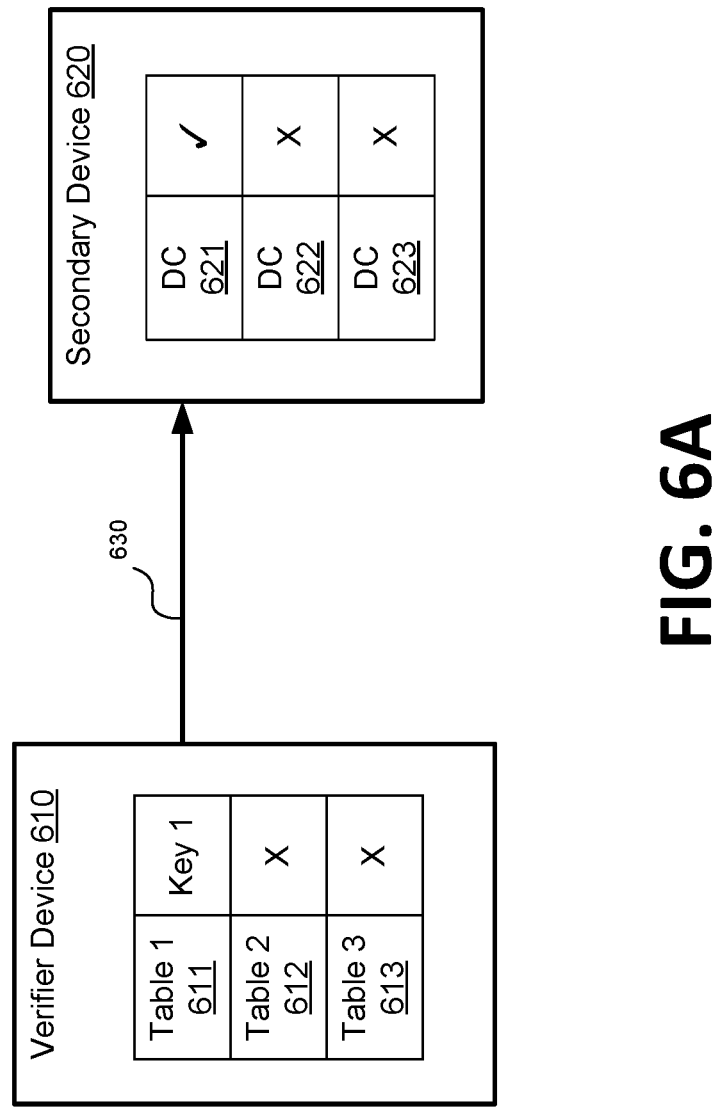
FIG. 6A illustrates the activation of dormant circuits of a secondary device based on activation indicators from encrypted tables of a verifier device in accordance with some embodiments.

FIG. 6A illustrates the activation of dormant circuits of a secondary device based on activation indicators from encrypted tables of a verifier device. In general, the encrypted tables may correspond to tables that are stored by the encrypted tables module 111 from a verifier device 110 of FIG. 1 and the dormant circuits may be included in a secondary device 120 of FIG. 1.

As shown in FIG. 6A, a verifier device 610 may include multiple encrypted tables 611, 612, and 613. The first table 611 may be decrypted by a first key that received by the verifier device 610 as previously described. The second table 612 and the third table 613 may be in an encrypted state as a corresponding key to decrypt either the second table 612 or the third table 613 has not yet been received by the verifier device 610. The secondary device 620 may include a first dormant circuit 621, a second dormant circuit 622, and a third dormant circuit 623. A first challenge 630 from the first table 610 may be transmitted to the secondary device 620 at a first time and in response to the receiving of the first challenge, the first dormant circuit 621 may be activated. For example, a dormant circuit activation indicator corresponding to activating the first dormant circuit 621 of the secondary device 620 may be transmitted from the verifier device 610 to the secondary device 620. As such, the operation of the first dormant circuit 621 may modify a value of a response key that is generated by the secondary device 620. However, since the second table 612 and the third table 613 are encrypted, a dormant circuit activation indicator from either table is not transmitted to the secondary device 620 to activate the second dormant circuit 622 or the third dormant circuit 623 and the operations of these dormant circuits may not be enabled to modify the value of the response key that is generated by the secondary device 620.

Figure 6B:
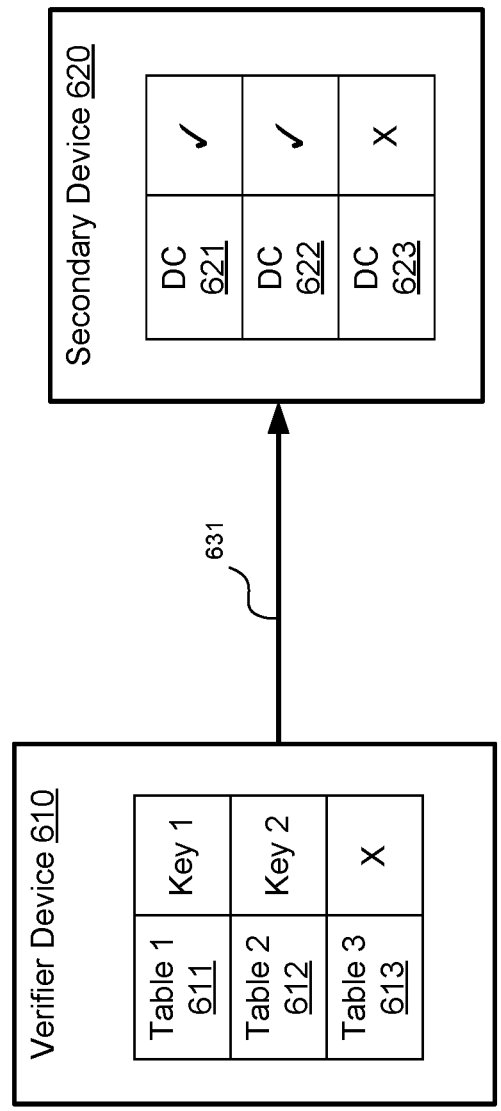
FIG. 6B illustrates the activation of an additional dormant circuit of a secondary device in accordance with some embodiments.

FIG. 6B illustrates the activation of an additional dormant circuit of a secondary device. In general, the encrypted tables may correspond to tables that are stored by the encrypted tables module 111 from a verifier device 110 of FIG. 1 and the dormant circuits may be included in a secondary device 120 of FIG. 1. The activation of the additional dormant circuit may correspond to the secondary device 620 after the receiving of another dormant circuit activation indicator.

As shown in FIG. 6B, the verifier device 610 may receive another key to decrypt the second table 612. In response to a subsequent request to authenticate the secondary device 620, another first challenge 631 from the second table 612 may be transmitted to the secondary device 620 and in response to the receiving of the first challenge 631, the second dormant circuit 622 may be activated. Thus, the first dormant circuit 621 and the second dormant circuit 622 may both be activated. The decryption of the second table 612 may cause a modification to the expected responses of previously used table 611. Furthermore, an operation of the first dormant circuit 621 and another operation of the second dormant circuit 622 may each be used to modify a value of a response key that is generated by the secondary device 620. However, since the third table 613 is still encrypted, a dormant circuit activation indicator from the third table 613 is not transmitted to the secondary device 620 to activate the third dormant circuit 623 and the operation of the third dormant circuit 623 may not be enabled to modify the value of the response key that is generated by the secondary device 620. As such, additional operations may be performed to modify the response key as each dormant circuit is activated.

Figure 7:
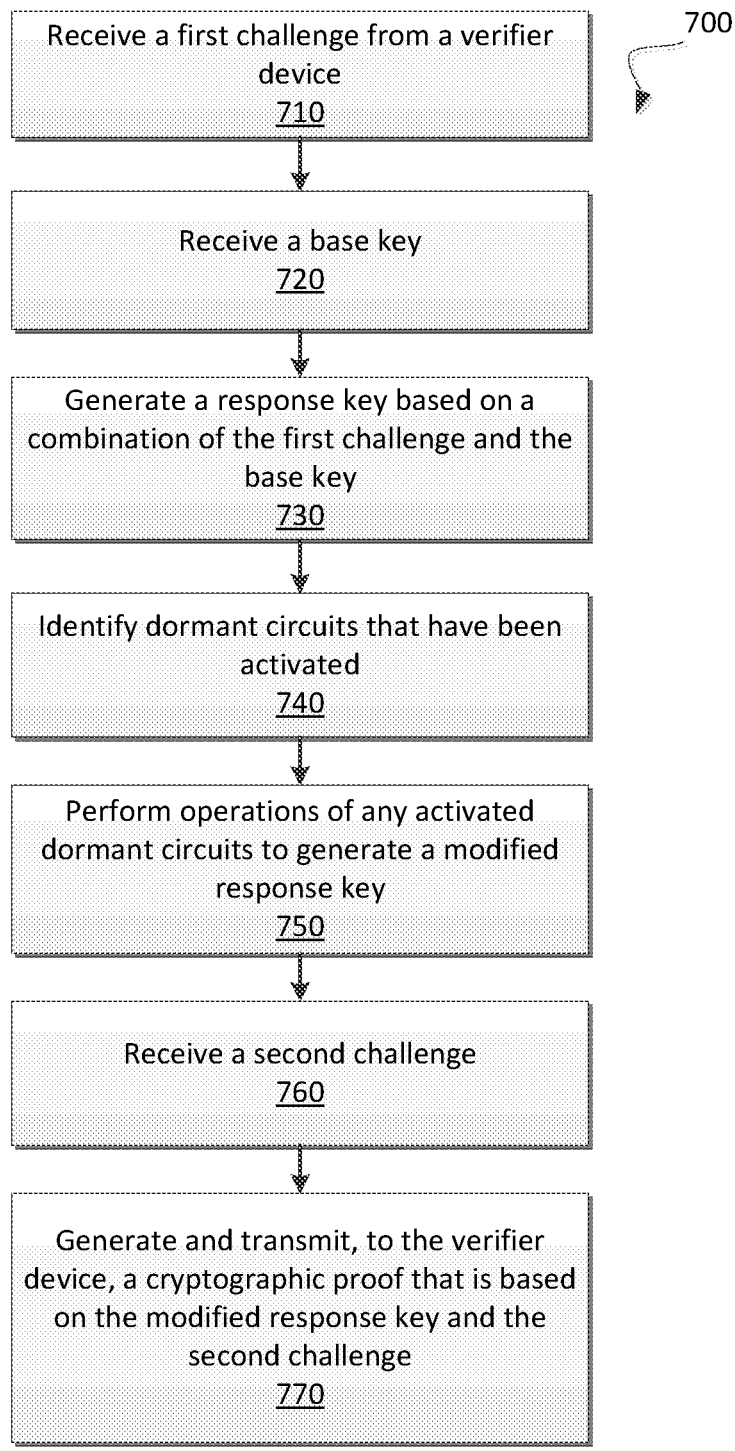
FIG. 7 is a flow diagram of an example method to generate a cryptographic proof based on the activation of dormant circuits in accordance with some embodiments of the present disclosure.

FIG. 7 is a flow diagram of an example method 700 to generate a cryptographic proof based on the activation of dormant circuits. In general, the method 700 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 may be performed by the response key derivation components 121 of a secondary device 120 of FIG. 1.

As shown in FIG. 7, the method 700 may begin with the processing logic receiving a first challenge from a verifier device (block 710). The first challenge may be received after requesting authentication by the verifier device. The processing logic may receive a base key (block 720). For example, the base key may be received from a memory of the secondary device or may be received from a first memory location (e.g., a one-time programmable memory of the secondary device) and a second memory location (e.g., circuitry of the secondary device that has been defined by a netlist) and may be combined to form the base key. The processing logic may generate a response key based on the combination of the first challenge and the base key (block 730). Furthermore, the processing logic may identify dormant circuits that have been activated (block 740). For example, one or more dormant circuits may be enabled to perform an operation to modify the response key. The processing logic may thus perform operations of any activated dormant circuits to generate a modified response key (block 750). Subsequently, the processing logic may receive a second challenge (block 760). The processing logic may then generate a cryptographic proof that is based on the modified response key and the second challenge and may transmit the cryptographic proof to the verifier device (block 770). As such, the cryptographic proof may be considered to be based on the operations of the activated dormant circuits.

Figure 8:
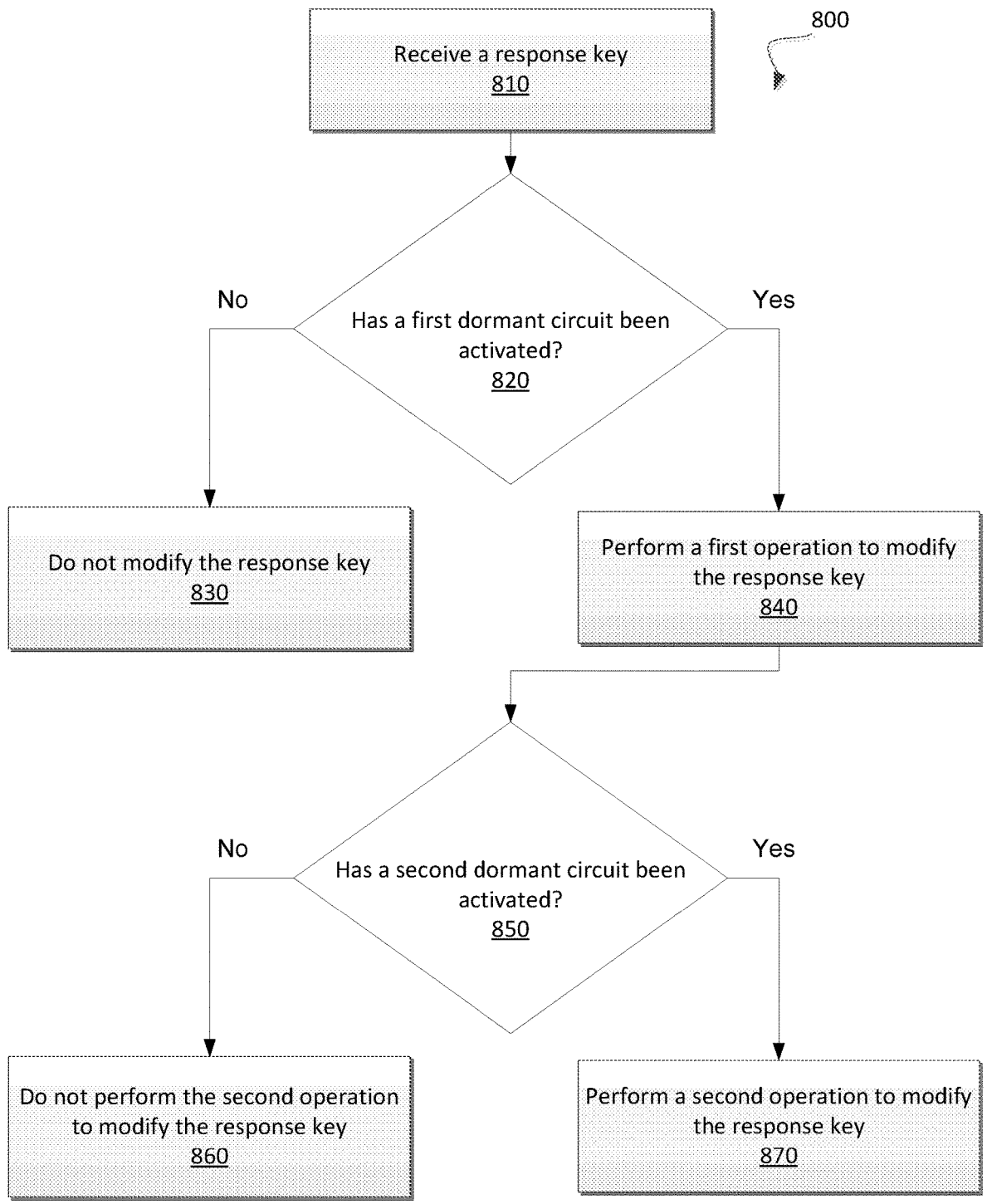
FIG. 8 is a flow diagram of an example method to generate a cryptographic proof based on the activation of dormant circuits in accordance with some embodiments.

FIG. 8 is a flow diagram of an example method 800 to generate a cryptographic proof based on the activation of dormant circuits. In general, the method 800 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 may be performed by the response key derivation components 121 of a secondary device 120 of FIG. 1.

As shown in FIG. 8, the method 800 may begin with the processing logic receiving a response key (block 810). The response key may be generated based on a combination of a base key and a first challenge that has been received from a verifier device as previously described. The processing logic may further determine whether a first dormant circuit has been activated (block 820). For example, a determination may be made as to whether a dormant circuit activation indicator for the first dormant circuit has been received from a decrypted table of the verifier device. If the first dormant circuit has not been activated, then the response key may not be modified (block 830). However, if the first dormant circuit has been activated, then a first operation may be performed to modify the response key (block 840). For example, the first dormant circuit may be used to perform a first modification to one or more bits of the response key. Furthermore, the processing logic may determine whether a second dormant circuit has been activated (block 850). If the second dormant circuit has not been activated (e.g., a second dormant circuit activation indicator has been received), then a second operation may not be performed to modify the response key (block 860). If the second dormant circuit has been activated, then a second operation may be performed to modify the response key (block 870). For example, the second operation may modify the response key after the response key has been modified by the first operation. Thus, the operations of each active dormant circuit may be performed sequentially to modify the response key.

FIG. 9A illustrates a response key that has been generated by a secondary device. As shown, the response key may include a series of bits at a first value of '0' and a second value of '1.' FIG. 9B illustrates the response key after the response key has been modified based on a first operation corresponding to a first dormant circuit. The first operation may change the most significant bit of the response key from one value to the opposite value. For example, as shown, the most significant bit of the response key may be changed from the first value of '0' to the second value of '1.' FIG. 9C illustrates the response key that has been modified based on a second operation corresponding to a second dormant circuit. The second operation may be performed on the result of the modification of the response key based on the first operation. For example, as shown, the second operation may change the least significant bit of the response key from the first value of '0' to the second value of '1.' After the performance of each operation corresponding to each active dormant circuit, the resulting modified response key may then be used in combination with a second challenge to generate a cryptographic proof.

Figure 10:
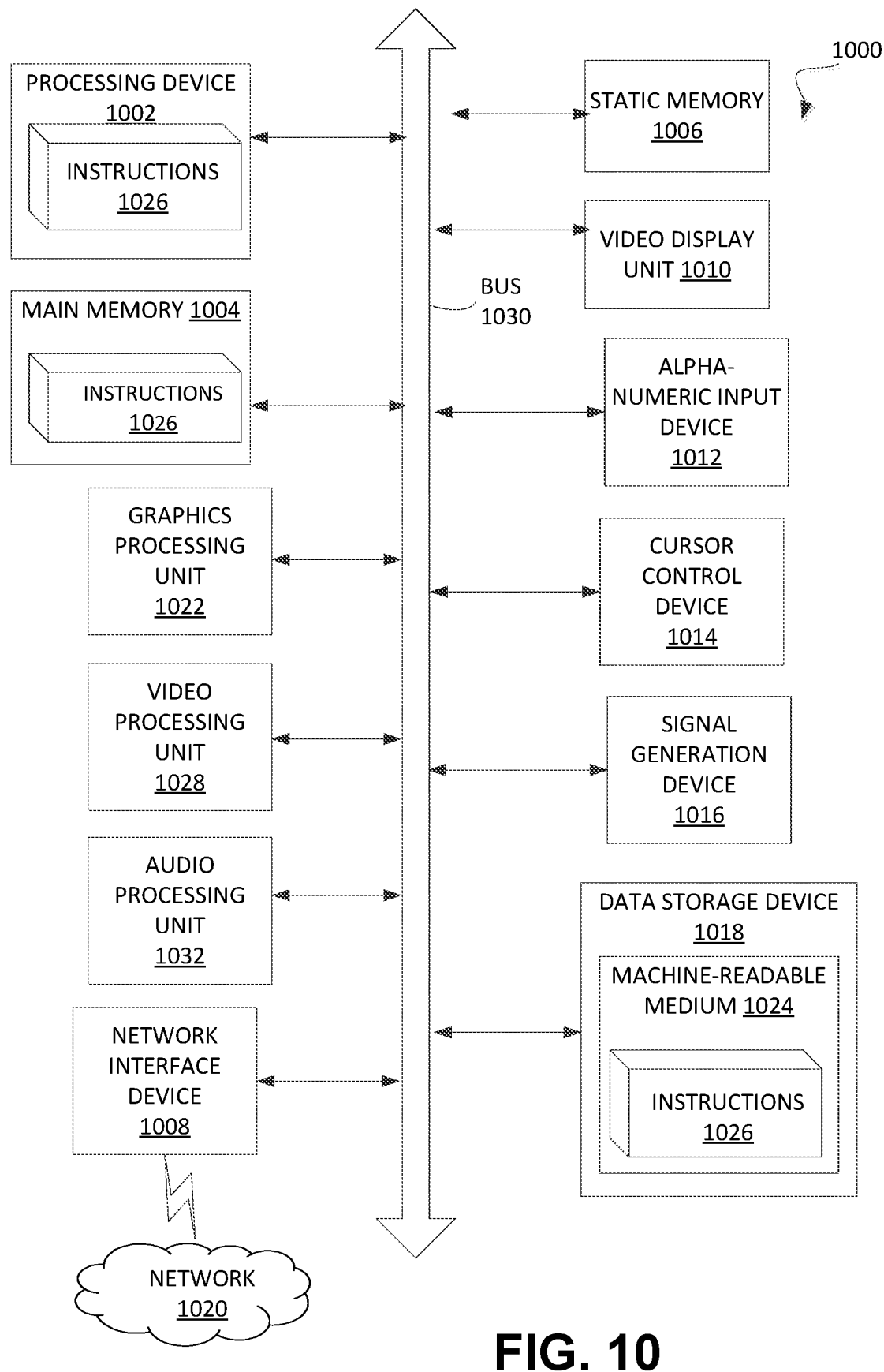
FIG. 10 illustrates a block diagram of an embodiment of a computer system in which some embodiments of the disclosure may operate.

FIG. 10 illustrates an example machine of a computer system 1000 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage device 1018, which communicate with each other via a bus 1030.

Processing device 1002 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 is configured to execute instructions 1026 for performing the operations and steps discussed herein.

The computer system 1000 may further include a network interface device 1008 to communicate over the network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), a graphics processing unit 1022, a signal generation device 1016 (e.g., a speaker), graphics processing unit 1022, video processing unit 1028, and audio processing unit 1032.

The data storage device 1018 may include a machine-readable storage medium 1024 (also known as a computer-readable medium) on which is stored one or more sets of instructions or software 1026 embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting machine-readable storage media.

In one implementation, the instructions 1026 include instructions to implement functionality corresponding to an encrypted tables module or response key derivation components (e.g., the encrypted tables module 111 or response key derivation components 121 of FIG. 1). While the machine-readable storage medium 1024 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
receiving a first table key capable of decrypting a first table from a plurality of encrypted tables, wherein each of the encrypted tables comprises at least one pair of values corresponding to a challenge value and a response value;
receiving a request to authenticate a secondary device;
in response to the request to authenticate the secondary device,
obtaining, using the first table key to decrypt an entry in the first table, a first challenge value, a first response value, and a first indicator to activate a first circuit of the secondary device; and
transmitting to the secondary device the first challenge value and the first indicator;
transmitting to the secondary device a second challenge value that is different than the first challenge value;
receiving a cryptographic proof from the secondary device; and
authenticating a validity of the cryptographic proof received from the secondary device by generating a second cryptographic proof based on a combination of the second challenge value, the first response value, and a first operation corresponding to the first circuit, and determining whether the cryptographic proof and the second cryptographic proof match.

2. The method of claim 1, further comprising:
receiving a second table key capable to decrypt a second table from the plurality of encrypted tables;
receiving a request to authenticate a different secondary device; and
authenticating the different secondary device using a third challenge value and a third response value from the second table decrypted using the second table key.

3. The method of claim 2, wherein authenticating the different secondary device is further based on the first table that has been decrypted, wherein one or more additional challenge values are transmitted to the different secondary device from another pair of values from one of the first table or the second table.

4. The method of claim 2, wherein authenticating the different secondary device comprises selecting a table from a plurality of tables for which table keys have been received.

5. The method of claim 4, wherein selecting the table comprises selecting the table from the plurality of tables using a weighted preference that selects the second table more often than the first table.

6. A method comprising:
receiving a table key capable of decrypting a first table from a plurality of encrypted tables, wherein each of the encrypted tables comprises at least one pair of values corresponding to a challenge value and a response value;
receiving a request to authenticate a secondary device;
in response to the request to authenticate the secondary device,
transmitting to the secondary device the challenge value obtained by using the table key to decrypt an entry in the first table;
transmitting to the secondary device a second challenge value;
receiving a cryptographic proof from the secondary device; and
authenticating a validity of the cryptographic proof received from the secondary device based on the second challenge value and the response value obtained by using the table key to decrypt the entry in the first table,
wherein the plurality of encrypted tables corresponds to a plurality of indicators to activate a plurality of circuits of the secondary device, wherein the first table corresponds to a first indicator to activate a first circuit of the secondary device and a second table corresponds to a second indicator to activate a second circuit of the secondary device, and wherein the first indicator is transmitted to the secondary device to activate the first circuit when the challenge value is transmitted from the first table, and wherein the second indicator is transmitted to the secondary device to activate the second circuit when another challenge value is transmitted to the secondary device from the second table after the second table has been decrypted by another table key.

7. A system comprising:
a memory; and
a processing device operatively coupled with the memory to:
receive a first table key capable of decrypting a first table from a plurality of encrypted tables, wherein each of the encrypted tables comprises at least one pair of values corresponding to a challenge value and a response value;
receive a request to authenticate a secondary device;
in response to the request to authenticate the secondary device, obtain a first challenge value, a first response value, and a first indicator using the first table key to decrypt an entry in the first table and transmit to the secondary device the first challenge value and the first indicator, the first indicator to activate a first circuit of the secondary device;
transmit to the secondary device a second challenge value that is different than the first challenge value;
receive a cryptographic proof from the secondary device; and
authenticate a validity of the cryptographic proof received from the secondary device by generating a second cryptographic proof based on a combination of the second challenge value, the first response value, and a first operation corresponding to the first circuit, and determining whether the cryptographic proof and the second cryptographic proof match.

8. The system of claim 7, wherein the processing device is further to:
receive a second table key capable to decrypt a second table from the plurality of encrypted tables;
receive a request to authenticate a different secondary device; and authenticate the different secondary device using a third challenge value and a third response value from the second table decrypted using the second table key.

9. The system of claim 8, wherein authentication of the different secondary device is further based on the first table that has been decrypted, wherein one or more additional challenge values are transmitted to the different secondary device from another pair of values from one of the first table or the second table.

10. The system of claim 9, wherein the processing device is further to select between the first table and the second table using a weighted preference that selects the second table more often than the first table.

11. The system of claim 7, wherein the plurality of encrypted tables corresponds to a plurality of indicators to activate a plurality of circuits of the secondary device, wherein the first table corresponds to the first indicator to activate the first circuit of the secondary device and a second table corresponds to a second indicator to activate a second circuit of the secondary device, and wherein the second indicator is transmitted to the secondary device to activate the second circuit when a third challenge value is transmitted to the secondary device from the second table after the second table has been decrypted by a second table key.

12. A non-transitory computer readable medium comprising instructions that, when executed by a processing device, cause the processing device to perform operations comprising:
  receive a first table key capable of decrypting a first table from a plurality of encrypted tables, wherein each of the encrypted tables comprises at least one pair of values corresponding to a challenge value and a response value;
  receive a request to authenticate a secondary device;
  in response to the request to authenticate the secondary device, obtain a first challenge value, a first response value, and a first indicator using the first table key to decrypt an entry in the first table and transmit to the secondary device the first challenge value and the first indicator, the first indicator to activate a first circuit of the secondary device;
  transmit to the secondary device a second challenge value that is different than the first challenge value;
  receive a cryptographic proof from the secondary device; and
  authenticate a validity of the cryptographic proof received from the secondary device by generating a second cryptographic proof based on a combination of the second challenge value, the first response value, and a first operation corresponding to the first circuit, and determining whether the cryptographic proof and the second cryptographic proof match.

13. The non-transitory computer readable medium of claim 12, the operations further comprising:
  receiving a second table key capable to decrypt a second table from the plurality of encrypted tables;
  receiving a request to authenticate a different secondary device; and
  authenticating the different secondary device using a third challenge value and a third response value from the second table decrypted using the second table key.

14. The non-transitory computer readable medium of claim 13, wherein authentication of the different secondary device is further based on the first table that has been decrypted, wherein one or more additional challenge values are transmitted to the different secondary device from another pair of values from one of the first table or the second table.

15. The non-transitory computer readable medium of claim 14, the operations further comprising select between the first table and the second table using a weighted preference that selects the second table more often than the first table.

16. The non-transitory computer readable medium of claim 12, wherein the plurality of encrypted tables corresponds to a plurality of indicators to activate a plurality of circuits of the secondary device, wherein the first table corresponds to the first indicator to activate the first circuit of the secondary device and a second table corresponds to a second indicator to activate a second circuit of the secondary device, and wherein the second indicator is transmitted to the secondary device to activate the second circuit when a third challenge value is transmitted to the secondary device from the second table after the second table has been decrypted by a second table key.

17. The method of claim 1, wherein the plurality of encrypted tables corresponds to a plurality of indicators to activate a plurality of circuits of the secondary device, wherein the first table corresponds to the first indicator to activate the first circuit of the secondary device and a second table corresponds to a second indicator to activate a second circuit of the secondary device, and wherein the second indicator is transmitted to the secondary device to activate the second circuit when a third challenge value is transmitted to the secondary device from the second table after the second table has been decrypted by another table key.

18. The method of claim 1, wherein generating the second cryptographic proof comprises:
  performing the first operation on the first response value that modifies one or more bits of the first response value to obtain a modified first response value; and
  generating the second cryptographic proof based on a combination of the second challenge value and the modified first response value.

19. The method of claim 1, wherein the first indicator is a hidden property of the first challenge value.

20. The system of claim 7, wherein, to generate the second cryptographic proof, the processing device is further to:
  perform the first operation on the first response value that modifies one or more bits of the first response value to obtain a modified first response value; and
  generate the second cryptographic proof based on a combination of the second challenge value and the modified first response value.

21. The system of claim 7, wherein the first indicator is a hidden property of the first challenge value.

22. The non-transitory computer readable medium of claim 12, wherein generating the second cryptographic proof comprises:
  performing the first operation on the first response value that modifies one or more bits of the first response value to obtain a modified first response value; and
  generating the second cryptographic proof based on a combination of the second challenge value and the modified first response value.

23. The non-transitory computer readable medium of claim 12, wherein the first indicator is a hidden property of the first challenge value.

* * * * *